United States Patent
Bailey, Jr. et al.

(10) Patent No.: US 12,445,409 B2
(45) Date of Patent: *Oct. 14, 2025

(54) NETWORK NAMESPACE MONITORING SYSTEM

(71) Applicant: Amazon Technologies, Inc., Seattle, WA (US)

(72) Inventors: Donald Lee Bailey, Jr., Rockingham, VA (US); Abigail Fuller, Seattle, WA (US); John Paul Torres, Shoreline, WA (US); Giulian Dalton Luz, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/679,290

(22) Filed: May 30, 2024

(65) Prior Publication Data

US 2024/0323159 A1 Sep. 26, 2024

Related U.S. Application Data

(63) Continuation of application No. 17/809,464, filed on Jun. 28, 2022, now Pat. No. 12,028,312.

(51) Int. Cl.
*H04L 61/3015* (2022.01)
*H04L 61/5007* (2022.01)
*H04L 61/5053* (2022.01)

(52) U.S. Cl.
CPC ...... *H04L 61/3025* (2013.01); *H04L 61/5007* (2022.05); *H04L 61/5053* (2022.05)

(58) Field of Classification Search
None
See application file for complete search history.

(56) References Cited

U.S. PATENT DOCUMENTS

| | | | |
|---|---|---|---|
| 9,258,293 B1 | 2/2016 | Sobel | |
| 9,712,532 B2 | 7/2017 | Krall et al. | |
| 9,813,374 B1 | 11/2017 | Magerramov | |
| 10,652,271 B2 | 5/2020 | Osterweil et al. | |
| 2005/0132058 A1 | 6/2005 | Hippelainen | |
| 2017/0149733 A1 | 5/2017 | Chastain | |
| 2018/0115582 A1 | 4/2018 | Thakar et al. | |
| 2019/0007364 A1 | 1/2019 | Wang | |
| 2021/0344714 A1* | 11/2021 | Yang | H04L 61/103 |
| 2022/0086119 A1* | 3/2022 | Zhou | H04L 61/4511 |
| 2022/0321596 A1* | 10/2022 | Weizman | H04L 61/4511 |

OTHER PUBLICATIONS

U.S. Appl. No. 17/809,464, filed Jun. 28, 2022, Bailey Jr., et al.

\* cited by examiner

*Primary Examiner* — Mohamed Ibrahim
(74) *Attorney, Agent, or Firm* — S. Scott Foster; Kowert, Hood, Munyon, Rankin & Goetzel, P.C.

(57) ABSTRACT

A namespace monitoring service may track released namespaces such as internet protocol (IP) addresses and manage namespace cooldown pools, available namespace pools, and a registry of released namespaces to detect and mitigate security vulnerabilities that arise from reassignment of namespaces. The namespace monitoring service provides access to the released namespace registry and/or sends a data stream of namespace registry updates. The namespace monitoring service may manage namespace reassignment process and extend the cooldown period of released namespaces or place a hold on available namespaces.

20 Claims, 10 Drawing Sheets

NETWORK NAMESPACE MONITORING SYSTEM

This application is a continuation of U.S. patent application Ser. No. 17/809,464, filed Jun. 28, 2022, which is hereby incorporated by reference herein in their entirety.

BACKGROUND

A regional Internet registry (RIR) is an organization that manages the allocation and registration of Internet number resources such as internet protocol (IP) addresses within its associated region of the world. A local Internet registry (LIR) is an entity that has been allocated a block of network addresses (or other types of namespaces) by an RIR and assigns parts of this block to its own customers. In addition to LIRs, other network resource registries may manage network addresses or various namespace resources. Various security vulnerabilities may arise from the allocation and management of namespaces during the disassociation and reassociation of namespace bindings.

Figure 1A:
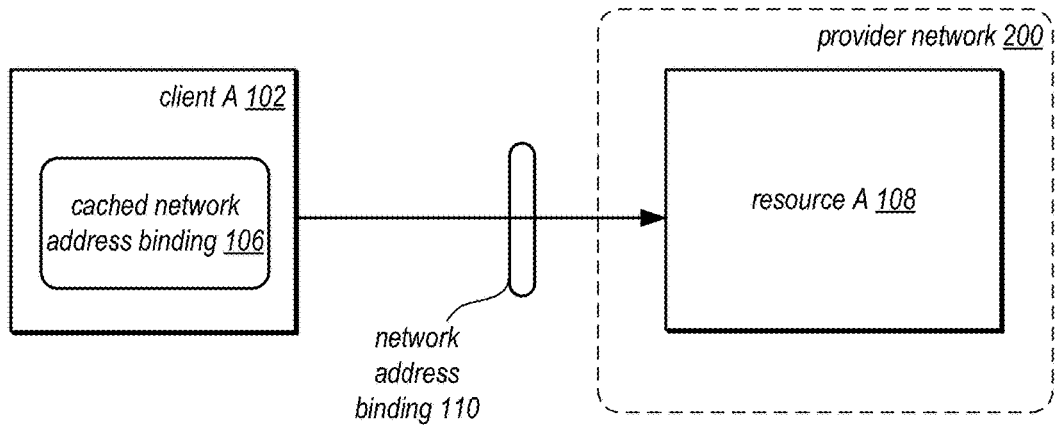
FIG. 1A illustrates a logical block diagram illustrating dangling pointer vulnerability that may arise due to a release of network address bindings or other namespace bindings and subsequent reassignment to another resource.
Figure 1A:
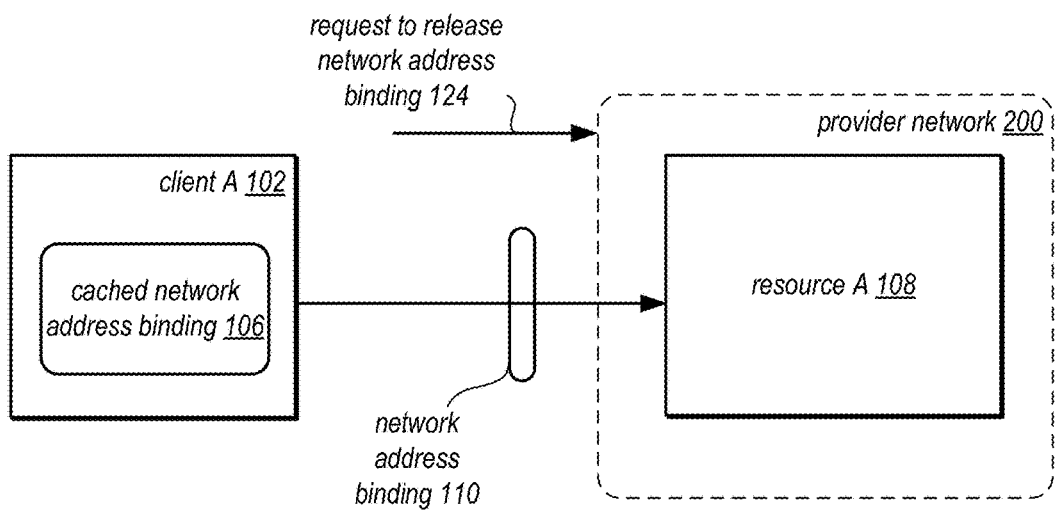
Figure 1A:
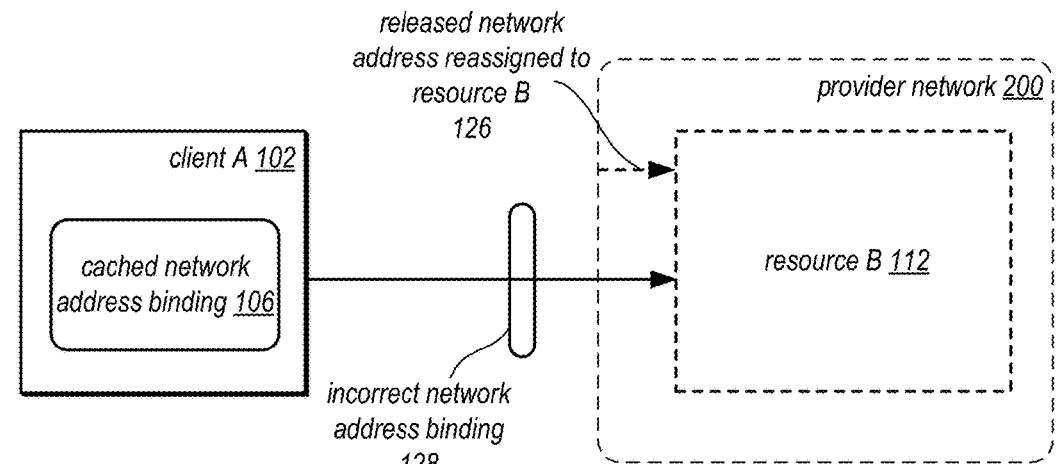

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques of monitoring released namespaces and managing their availability for associations are described herein. Internet service providers (ISPs), cloud service providers (CSPs), and other network service providers obtain delegated ownership of network addresses, such as Internet Protocol (IP) addresses obtained from American Registry for Internet Numbers (ARIN) or other equivalent regional Internet registries (RIR). These service providers may then assign these addresses to resources such that various clients may be able to use the network addresses to access the resource. Access to the resources may involve one or more namespaces. A namespace may be any of the various identifiers used to identify a resource ranging from network addresses (such as an IP address) to identification strings (such as a domain name). The control of these resources, and therefore their associated network addresses, may be given or leased to authorized users or customers. However, due to the large number of resources the users manage and/or due to errors, the various network addresses may be inadvertently released back to the service provider that generated the binding between the network address and the resource without correcting the appropriate namespace binding management (such as a domain name service (DNS) provider) or correcting an implicit trust binding that exists inside other resources. Once these network addresses are mistakenly released back to the provider, whether manually or in an automated process, the user must correct the incorrect binding that now exist due to the binding being released. However, due to the high volume in the deprecation of resources and modification of such bindings, secondary resource configuration pointers and other implicit trust bindings may not be removed-therefore unknowingly introducing a dangling resource vulnerability.

In order to detect the described dangling resource vulnerabilities various security companies, contractors, and malicious actors, may rapidly request a large number of the provider network addresses to perform subsequent lookups against a secondary resource configurations, such as a domain name service (DNS) provider. Through this reverse lookup, dangling resource vulnerabilities may be identified. The security actors either report the dangling resource concern to the previous network address owner (often for a fee) or abuse the remnant pointer trust relationship to gain unauthorized access to the resource and associated data. Regardless, this high-volume scanning method involves requesting large number of provider network addresses to randomly chance upon a dangling resource and is largely inefficient-such methods require an almost brute-force methodology that can exhaust valuable time and resources of the service provider for occasional critical detections.

Moreover, the negative impact on the provider from the high-volume scanning method is further compounded by various cycling procedures of the namespaces. For example, released network addresses may be placed in a cooldown pool wherein they become available for a new association with another resource after a prerequisite cooldown period. In the case of high-volume scanning method described previously, there may be asymmetry between the rate at which the network addresses (or other namespaces) are made available versus rate which they are placed in the cooldown pool resulting in potential exhaustion in the stock of available namespaces. The inefficient high-volume scanning method may create unnecessary and potential operationally-debilitating overhead—in some cases active protective measures may even be required to prevent this asymmetry. A namespace monitoring system and methods for service providers, which efficiently detects dangling resources as well as enables third-parties to identify dangling resource vulnerabilities, may provide substantial benefits The namespace monitoring system may generate a regularly updated published registry of unassigned network addresses that have been released from a namespace binding. The released namespace registry may provide one or more namespaces being monitored by the namespace monitoring system and allow efficient identification of dangling resources instead of the random, brute force cycling of service provider network addresses.

In some embodiments, unassigned network addresses released by previous users may be selectively provided using an application programming interface (API) or subscription to a data pipeline for real-time streaming analytics. In some embodiments, the streaming data may trigger subsequent secondary pointer resource lookup for vulnerability identification, reporting, and mitigation. Other services could be associated with or be part of this monitoring service, including a service that reports such concerns to customers, a service that proactively holds such concerns until authorized to be made available, or a service that only permits access to the registry for a fee that could be adjusted based on volume and frequency of access to the registry.

FIG. 1A illustrates a logical block diagram illustrating a dangling pointer vulnerability that may arise due to a release in namespace binding and subsequent reassignment to another resource.

In scene 132, a provider network 200 may host a resource A 108 having an network address or other network addresses associated with the resource A 108. The provider network 200 may be similar to the provider network described further in FIG. 2. In some embodiments, the provider network 200 may be an entity such as ISPs, CSPs, or other service providers that has obtained delegated ownership of network addresses from ARIN or other equivalent RIRs. The provider network may assign these network addresses to resources such that various clients, such as client A 102, may utilize network address binding 110 or other equivalent namespace bindings to access the resource A 108 hosted in the provider network 200. The client A may receive a cached network address binding 106 from a Domain Name System (DNS) web service which routes the client to resource A 108 by translating domain names such as "www.example.com" into the respective numeric network addresses. Control over the resource A 108 may be given to an authorized user of the provider network 200 and the associated network addresses may be leased to the authorized user.

In scene 134, provider network 200 may receive a request to release network address binding 124. The request to release network address binding 124 may be sent to the provider network in the form of a request towards provider network 200 to deprecate, or move, or host to a different provider network the resource A 108. The request to release network address binding 124 may be a result of an intentional or unintentional actions of the authorized user. In some embodiments the release of network address binding 124 may be based on of the provider network 200. The subsequent release of network address binding 124 may result in the network address being available to be reassigned to a different resource and leased to another user.

In scene 136, once the network address has been released as shown in scene 134, the network address may be reassigned to resource B 126. Control over resource B 112 may be given to another user of the provider network 200 and the associated network addresses may be leased to that user. Although the binding has been changed, the client A 102 may not be aware of the release of network address binding and may still hold on to the now incorrect cached network address binding 106. The network address binding 110 that allowed client A 102 access to resource A 108 may become an incorrect network address binding 128 as the intended resource, resource A 108, has been disassociated. If client A 102 is unaware of this incorrect binding and fails to remove cached network address binding or other secondary resource configuration pointers a "dangling resource vulnerability" may be introduced. Moreover, in some embodiments, the DNS registrar or other services that inform clients of namespace bindings may not be notified of the disassociation and thus further create instances where a client has incorrect network address bindings. In some embodiments, various other namespaces may be used other than network addresses and domain names such a global namespace associated with a set of resources of a respective CSP or autonomous system (AS) numbers.

Figure 1B:
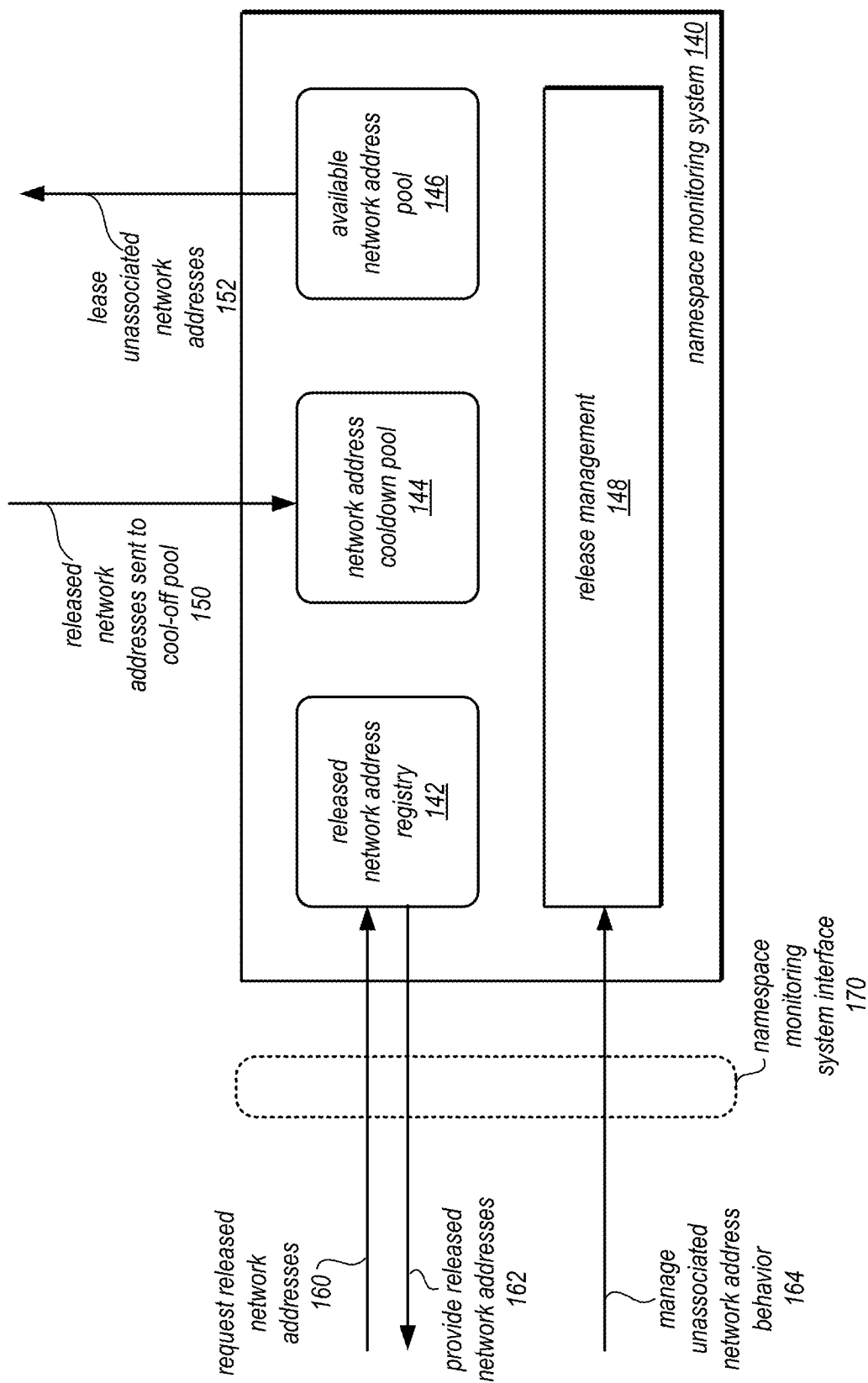
FIG. 1B illustrates a logical block diagram illustrating a namespace monitoring system to monitor and manage network addresses or other namespace, according to some embodiments.

FIG. 1B illustrates a logical block diagram illustrating a namespace monitoring system to monitor and manage network addresses or other namespaces, according to some embodiments. In some embodiments a namespace monitoring system 140 may contain an network address cooldown pool 144, available network addresses pool 146, released network address registry 142 and a release management 148. The network address cooldown pool 144 may receive released network addresses sent to the cool-off pool 150 from one or more network address management layers of the network provider. network addresses may be sent to the network address cooldown pool 144 as a result of deprecation of the resource to which the network address was bound, movement of the resource to another network address, or movement of the resource to a different provider network. The released network address registry 142 of the namespace monitoring system 140 may obtain the released network addresses received by the network address cooldown pool 144 and may inform clients of the monitoring system 140 one or more released network addresses that the client may use to determine whether there is in their system any dangling resources.

One or more clients of the namespace monitoring system 140 or downstream applications may request one or more released network addresses 160 from the released network addresses registry 142, via a namespace monitoring system interface 170, to identify potential of dangling resources vulnerabilities. The released network addresses registry 142 provides released network addresses 162. The released network address registry 142 may send one or more requested unassigned network addresses that have been released from a namespace binding. In some embodiments, the released network addresses may be determined based on the identity of the requesting entity, such as an account of a cloud service provider like provider network 200 as further discussed in FIG. 4. In some embodiments, the request 160 may be a request to subscribe and be notified of updates to the released network address registry 142 and is further discussed in FIG. 7. The released network addresses registry may provide released network addresses 162 via the namespace monitoring system interface 170. The released namespace registry may provide one or more released network addresses and/or other namespaces monitored by the namespace monitoring system and allow efficient identification of dangling resources.

In some embodiments clients of the namespace monitoring system 140 may manage unassociated network address behavior 164 via the namespace monitoring system interface 170 by changing the cooldown period of certain released network addresses associated with certain owners of previously bound resources. After passage of the respective cooldown period for the released network addresses, the network addresses are moved to the available network address pool 146. The available network address pool 146 may then lease the unassociated network addresses 152 to another owner of the new resource and bind the network address to that new resource. In some embodiments, the network addresses in the available network address pool 146 may be placed on hold and made unavailable based on the release management 148 as is further discussed in FIG. 5. In some embodiments, the network address cooldown pool 144 and available network address pool 146 may be a separate from the namespace monitoring system and may be configured by to the namespace monitoring system 140.

Please note that the previous description of a namespace monitoring system 140 is a logical illustration and thus is not to be construed as limiting as to the implementation of network addresses, system interfaces, or various other features. In some embodiments various other namespaces may be used instead of network address such as names of containers for objects stored using a cloud storage service, autonomous system (AS) numbers. Different combinations or implementations may be implemented in various embodiments.

This specification continues with a general description of a provider network that implements a network namespace release monitoring service. Then various examples of a network namespace release monitoring service including different components/modules, or arrangements of components/module that may be employed as part of implementing the network namespace release monitoring service are discussed. A number of different methods and techniques to implement various methods of providing released namespaces and controlling the availability of namespaces for new associations then discussed, some of which are illustrated in accompanying flowcharts. Finally, a description of an example computing system upon which the various components, modules, systems, devices, and/or nodes may be implemented is provided. Various examples are provided throughout the specification.

Figure 2:
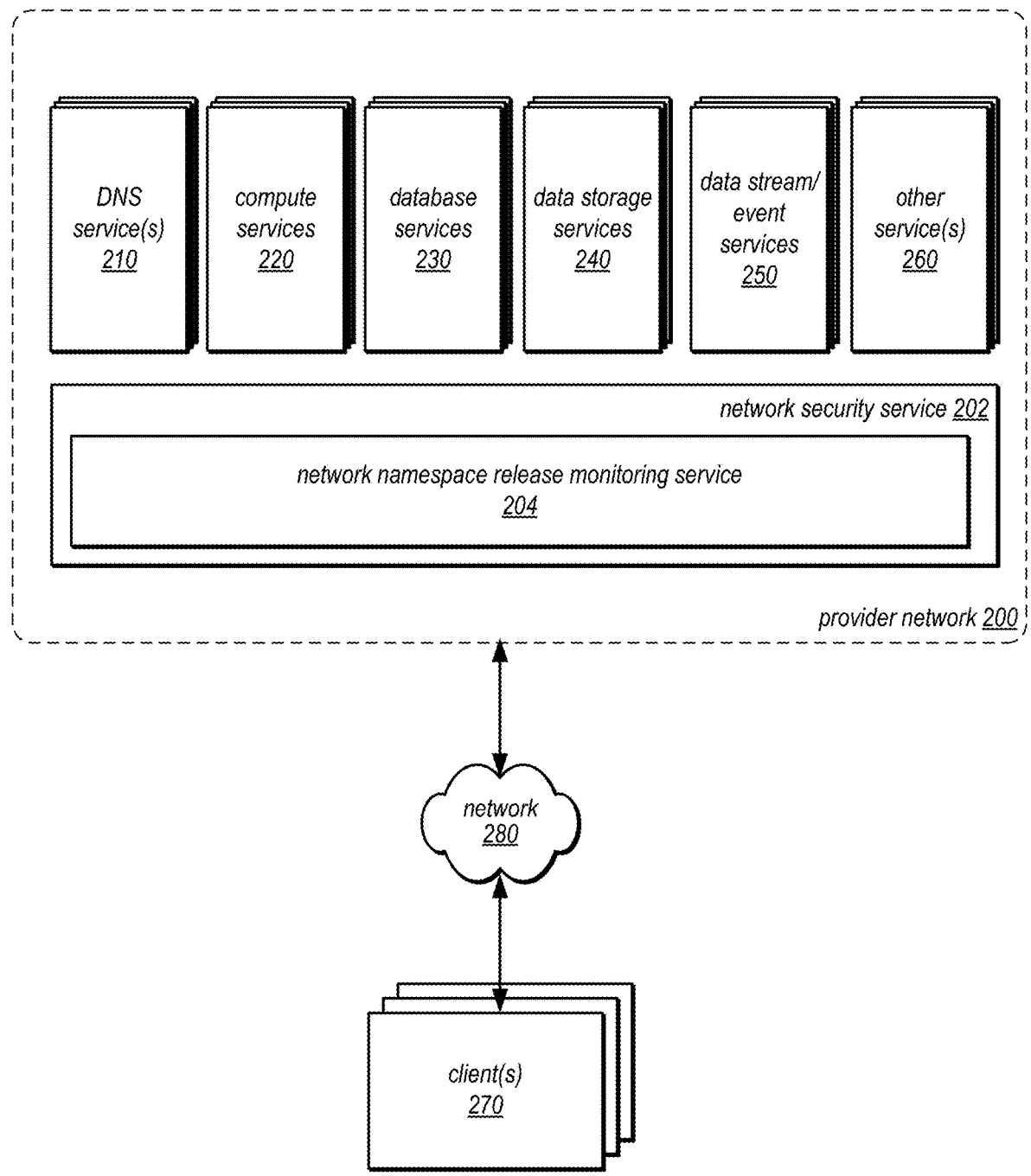
FIG. 2 is a logical block diagram illustrating a provider network offering a network security service, including network namespace release monitoring service, that monitor and manages namespaces, according to some embodiments.

FIG. 2 is a logical block diagram illustrating a provider network offering a network security service, including network namespace release monitoring service, that monitor and manages namespaces, according to some embodiments. Provider network 200 may be a private or closed system or may be set up by an entity such as a company or a public sector organization to provide one or more services (such as various types of cloud-based storage) accessible via the Internet and/or other networks to clients 270, in some embodiments. Provider network 200 may be implemented in a single location or may include numerous data centers hosting various resource pools, such as collections of physical and/or virtualized computer servers, storage devices, networking equipment and the like (e.g., computing system 900 described below with regard to FIG. 9), needed to implement and distribute the infrastructure and services offered by the provider network 200. In some embodiments, provider network 200 may implement various computing systems, services, resources, or services, such as a network security service 202, DNS service(s) 210 compute services 220, database service(s) 230, (e.g., relational or non-relational (NoSQL) database query engines, map reduce processing, data flow processing, and/or other large scale data processing techniques), data storage service(s) 240, (e.g., an object storage service, block-based storage service, or data storage service that may store different types of data for centralized access), data stream and/or event services 250, and other services 260 (any other type of network based services (which may include various other types of storage, processing, analysis, communication, event handling, visualization, and security services not illustrated). The respective resource pools, such as collection of virtualized computer servers, storage devices, and the like may be assigned an network address or various other namespaces. For example, the resources of the various services of the provider network 200 may be assigned a global network address that may be publicly accessible from the Internet or assigned a local-scope network address across the network resources. In some embodiments, the namespace assigned to the network resources may be of containers for objects stored using a cloud storage service.

Figure 3:
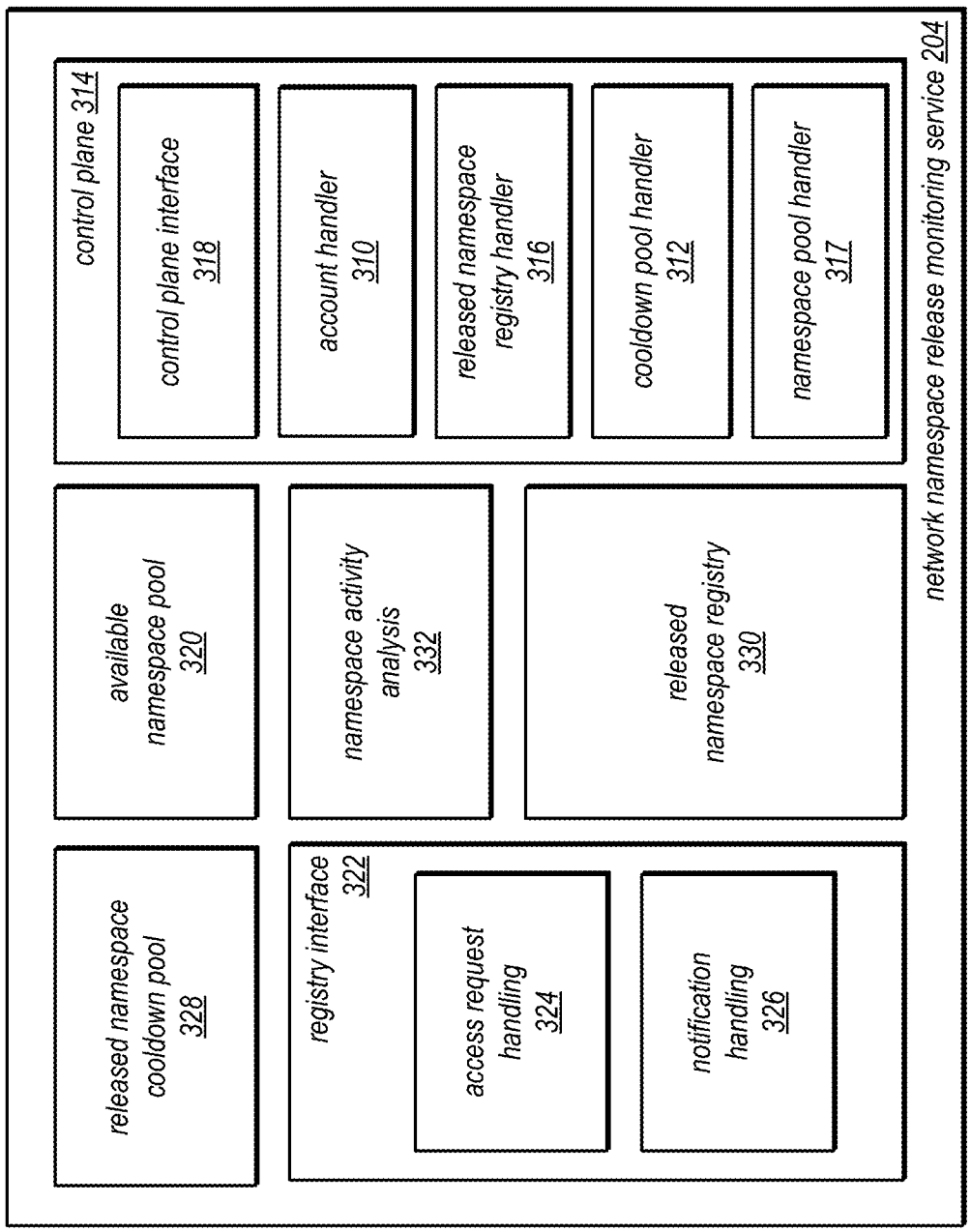
FIG. 3 is a logical block diagram illustrating a network namespace release monitoring service and various components that monitors and manages release of namespaces, according to some embodiments.
Figure 4:
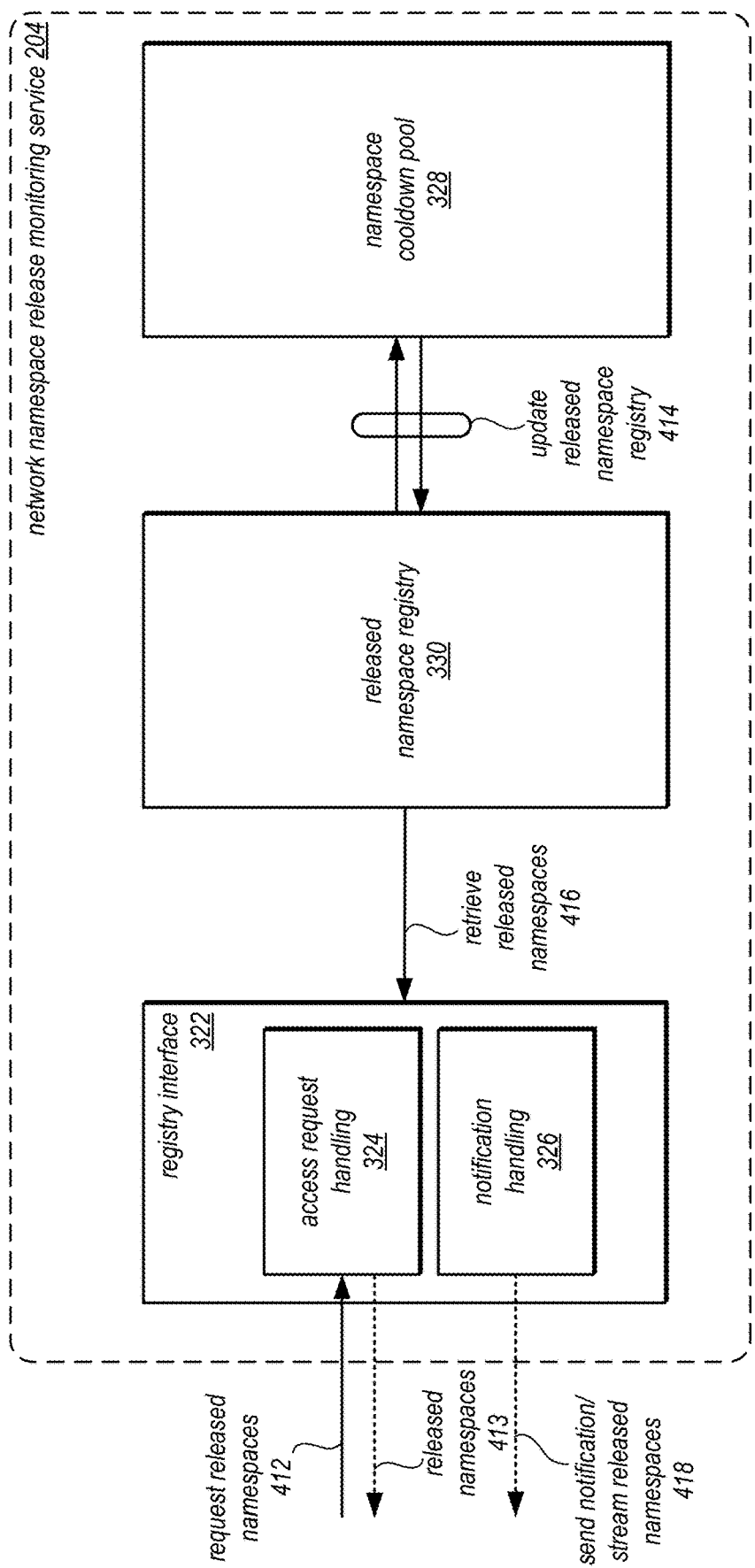
FIG. 4 is logical block diagram illustrating interactions supported by an example registry interface of the network namespace release monitoring service to provide released namespaces, according to some embodiments.
Figure 5:
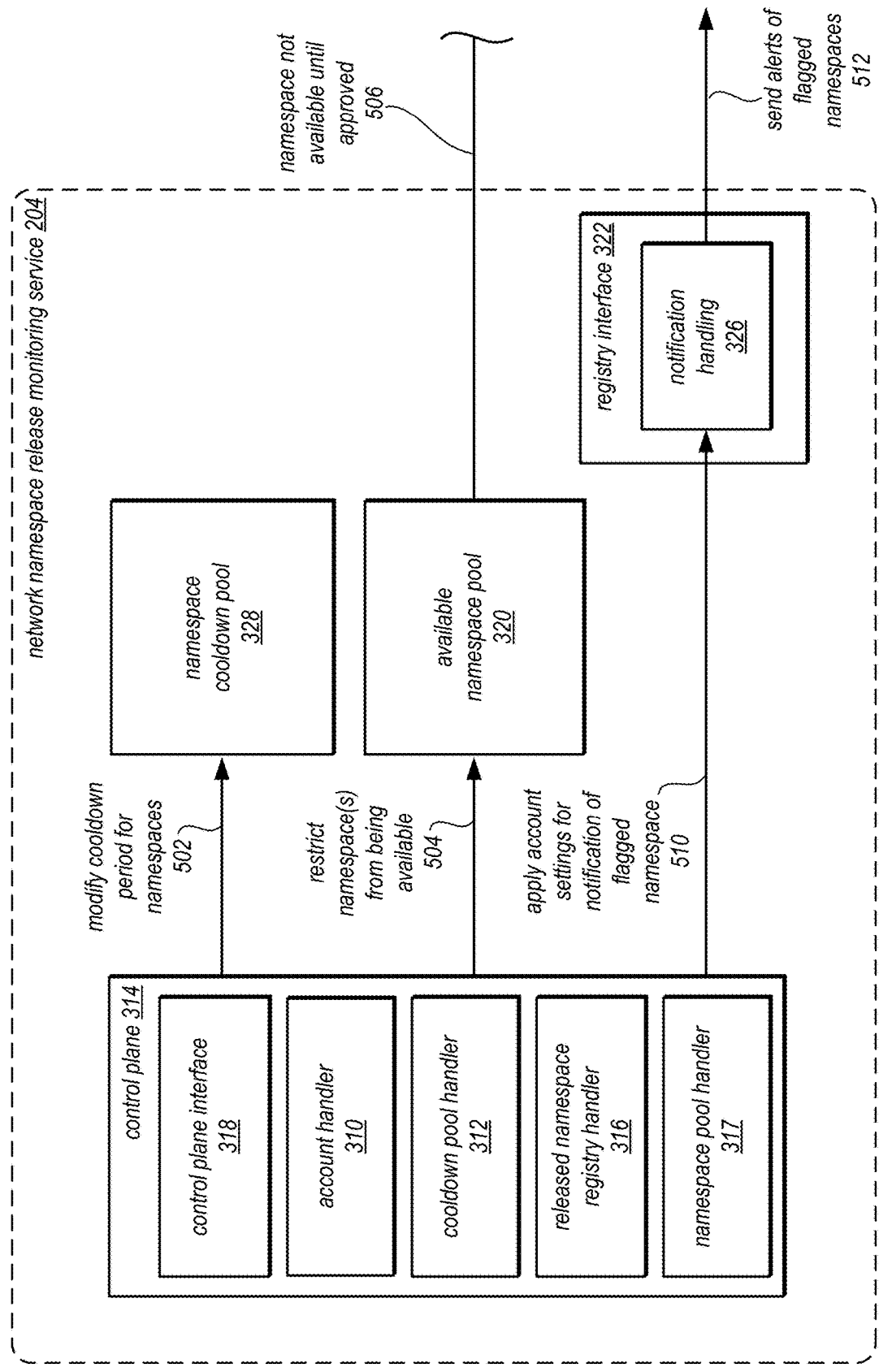
FIG. 5 is logical block diagram illustrating interactions of network namespace release monitoring service to control the availability of namespaces for new associations, according to some embodiments.

In various embodiments, the network security service 202 may comprise a network namespace release monitoring service 204 that monitors/tracks released namespaces, such as released network addresses, and maintains the namespaces as further discussed in FIGS. 3-5.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 9 and described below. In various embodiments, the functionality of a given system or service component (e.g., a component of data storage service 230) may be implemented by a particular node or may be distributed across several nodes. In some embodiments, a given node may implement the functionality of more than one service system component (e.g., more than one data store component).

Compute services 220 may be implemented by provider network 200, in some embodiments. Compute services 220 may offer instances, containers, and/or functions according to various configurations for client(s) 270 operation. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A container may provide a virtual operation system or other operating environment for executing or implementing applications. A function may be implemented as one or more operations that are performed upon request or in response to an event, which may be automatically scaled to provide the appropriate number computing resources to perform the operations in accordance with the number requests or events. A number of different types of computing devices may be used singly or in combination to implement the compute instances, containers, and/or functions and of provider network 200 in different embodiments, including general purpose or special purpose computer servers, storage devices, network devices and the like. In some embodiments, instance client(s) 270 or other any other user may be configured (and/or authorized) to direct network traffic to a compute instance.

Compute instances, containers, and/or functions may operate or implement a variety of different services, such as application server instances, general purpose or special-purpose operating systems, services that support various interpreted or compiled programming languages such as Ruby, Perl, Python, C, C++ and the like, or high-performance computing services) suitable for performing client(s) 270 applications, without for example requiring the client(s) 270 to access an instance. Applications (or other software operated/implemented by a compute instance and may be specified by client(s), such as custom and/or off-the-shelf software. The compute services 220 as well as the namespaces assigned to the respective resources/containers may be leased out to client(s) 270. In some embodiments, DNS service(s) 210 of the provider network 200 may generate namespace bindings of the various resources and their namespaces or in another DNS outside of the provider network. In some embodiments, the client(s) 270 to which the resources having namespaces remove resources may release the namespace bindings without the provider network DNS service(s) 210 or an external DNS reflecting the disassociation.

Compute instance configurations may also include compute instances, containers, and/or functions with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, containers, and/or functions, such as a particular number of virtual CPU cores, memory, cache, storage, as well as any other performance characteristic. Configurations of compute instances, containers, and/or functions may also include their location, in a particular data center, availability zone, geographic, location, etc. . . and (in the case of reserved compute instances, containers, and/or functions) reservation term length.

In various embodiments, database services 230 may be various types of data processing services that perform general or specialized data processing functions (e.g., analytics, big data querying, time-series data, graph data, document data, relational data, non-relational data, structured data, semi-structured data, unstructured data, or any other type of data processing operation) over data that is stored across multiple storage locations, in some embodiments. For example, in at least some embodiments, database services 230 may include various types of database services (e.g., relational) for storing, querying, and updating data. Such services may be enterprise-class database systems that are scalable and extensible. Queries may be directed to a database in database service(s) 230 that is distributed across multiple physical resources, as discussed below, and the database system may be scaled up or down on an as needed basis, in some embodiments. The database system may work effectively with database schemas of various types and/or organizations, in different embodiments. In some embodiments, clients/subscribers may submit queries or other requests (e.g., requests to add data) in a number of ways, e.g., interactively via an SQL interface to the database system or via Application Programming Interfaces (APIs). In other embodiments, external applications and programs may submit queries using Open Database Connectivity (ODBC) and/or Java Database Connectivity (JDBC) driver interfaces to the database system.

In some embodiments, database services 230 may include services that process requests to data that is not stored in fully structured storage (e.g., non-relational or NoSQL databases). In other embodiments, database services 230 may locally store, managed, and access semi-structured or not-structured data. In some embodiments, database services 230 may be various types of data processing services to perform different functions (e.g., query or other processing engines to perform functions such as anomaly detection, machine learning, data lookup, or any other type of data processing operation). For example, in at least some embodiments, database services 230 may include a map reduce service that creates clusters of processing nodes that implement map reduce functionality over data stored in one of data storage services 240. Various other distributed processing architectures and techniques may be implemented by database services 230 (e.g., grid computing, sharding, distributed hashing, etc.). Note that in some embodiments, data processing operations may be implemented as part of data storage service(s) 230 (e.g., query engines processing requests for specified data). Similar to the compute services 220, the database services 230 and data storage services 240 may have namespaces assigned to the respective resources/containers that may be leased out to client(s) 270. In some embodiments, the database services 230 and data storage services 240 of the provider network 200 may generate namespace bindings of the various resources and their namespaces or in another DNS outside of the provider network. In some embodiments, the client(s) 270 to which the resources having namespaces remove resources may release the namespace bindings without the provider network DNS service(s) 210 or an external DNS reflecting the disassociation.

Data storage service(s) 240 may implement different types of data stores for storing, accessing, and managing data on behalf of clients 270 as a network-based service that enables clients 270 to operate a data storage system in a cloud or network computing environment. For example, one data storage service 230 may be implemented as a centralized data store so that other data storage services may access data stored in the centralized data store for processing and or storing within the other data storage services, in some embodiments. Such a data storage service 240 may be implemented as an object-based data store, and may provide storage and access to various kinds of object or file data stores for putting, updating, and getting various types, sizes, or collections of data objects or files. Such data storage service(s) 240 may be accessed via programmatic interfaces (e.g., APIs) or graphical user interfaces. A data storage service 240 may provide virtual block-based storage for maintaining data as part of data volumes that can be mounted or accessed similar to local block-based storage devices (e.g., hard disk drives, solid state drives, etc.) and may be accessed utilizing block-based data storage protocols or interfaces, such as internet small computer interface (iSCSI).

In various embodiments, data stream and/or event services 250 may provide resources to ingest, buffer, and process streaming data in real-time. In some embodiments, data stream and/or event services 250 may act as an event bus or other communications/notifications for event driven systems or services (e.g., events that occur on provider network 200 services and/or on-premise systems or applications). The data stream/event services 250 may ingest, buffer, and process namespace data including, released namespaces and network addresses on cooldown. In some embodiments, the streamed network addresses may be determined based on the identity of the requesting entity and the levels or "tiers" of services that the requesting request possesses.

Generally speaking, clients 270 may encompass any type of client configurable to submit network-based requests to provider network 200 via network 280, including requests for release monitoring service management service 210 (e.g., a request to create a release monitoring service from different data sources of the other provider services and identify one or more as a target data source). For example, a given client 270 may include a suitable version of a web browser, or may include a plug-in module or other type of code module that may execute as an extension to or within an execution environment provided by a web browser. Alternatively, a client 270 may encompass an application such as a database application (or user interface thereof), a media application, an office application or any other application that may make use of resources in in provider network 200 to implement various features, systems, or applications. (e.g., to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 270 may be an application may interact directly with provider network 200. In some embodiments, client 270 may generate network-based services requests according to a Representational State Transfer (REST)-style network-based services architecture, a document- or message-based network-based services architecture, or another suitable network-based services architecture.

In some embodiments, a client 270 may provide access to provider network 200 to other applications in a manner that is transparent to those applications. For example, client 270 may integrate with an operating system or file system to provide storage on one of data storage service(s) 240 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 240 may be coordinated by client 270 and the operating system or file system on behalf of applications executing within the operating system environment.

Clients 270 may convey network-based services requests (e.g., request released network addresses) to and receive responses from provider network 200 via network 280. In various embodiments, network 280 may encompass any suitable combination of networking hardware and protocols necessary to establish network-based-based communications between clients 270 and provider network 200. For example, network 280 may generally encompass the various telecommunications networks and service providers that collectively implement the Internet. Network 280 may also include private networks such as local area networks (LANs) or wide area networks (WANs) as well as public or private wireless networks. For example, both a given client 270 and provider network 200 may be respectively provisioned within enterprises having their own internal networks. In such an embodiment, network 280 may include the hardware (e.g., modems, routers, switches, load balancers, proxy servers, etc.) and software (e.g., protocol stacks, accounting software, firewall/security software, etc.) necessary to establish a networking link between given client 270 and the Internet as well as between the Internet and provider network 200. It is noted that in some embodiments, clients 270 may communicate with provider network 200 using a private network rather than the public Internet.

FIG. 3 is a logical block diagram illustrating a network namespace release monitoring service and various components that monitors and manages release of namespaces, according to some embodiments.

In some embodiments, network namespace release monitoring service 204 may be comprised of a control plane 314. The control plane interface 318 may allow users to interact with the control plane through various communication protocols including various API requests. The account handler 310 may interact with the namespace release monitoring service 204 to determine various accounts whose resources the one or more network addresses or other namespaces have been bound to. The release namespace registry handler 316 may configure the namespace registry 330 such as the update configuration involving the additional and deletion of namespaces based on time, reassignment status, etc. In some embodiments the released namespace cooldown pool 328 may contain the released namespaces that are received by the network namespace release monitoring service 204 that are in cooldown. The cooldown period maybe dependent on the respective cooldown periods associated certain accounts associated with the resource from which the namespace was released. The namespace cooldown pool 328 may be used by the release namespace registry 330 to obtain new released namespaces as well as determine which namespaces to remove.

The released namespace registry 330 may be updated with new release namespaces from the released namespace cooldown pool 328 in regular intervals and/or as new released namespaces are provided to the cooldown pool. In some embodiments, the release namespace registry 330 may be regularly updated based on the account to which the disassociated resource. Once the release names space cooldown pool 328 the release namespaces may be transferred to the available namespace pool 320 and may be bound to new resources there are leased under the control of one or more accounts. In some embodiments the registry interface 322 may be used to interface communications between the client and release namespace registry at 330.

One of our clients may communicate to the registry interface 322 or request for one or more namespaces. They Request may include the time frame from which the namespace why is released, the type of namespace released, whether the namespaces are in the cooldown pool, and/or the account to which the resource that are namespace was dissociated from belonged to. The registry interface may further contain a notification handling 326 of the registry interface 322 that responds to the access request in some embodiments. The release namespace registry 330 may subsequently obtain the proper namespaces from the released namespace cooldown pool 328 or available namespace pool 320. As described in FIG. 1B, the released namespace cooldown pool 328, available namespace pool 320, and other components maybe outside of the network namespace release monitoring 204, in some embodiments.

The control plane 314 may be used to allow clients of the network namespace release monitoring service 204 to configure the various components therein. The account handler 310 may be used to determine the behavior of one or more namespaces based on the account to which the resource was leased to. In some embodiments a particular account may be associated with a distinct type of namespace handling such as having formerly associated namespaces having a different cooldown period, notifying the notification handling 326 of a placement of formerly associated namespaces into the release namespace registry, or placing a hold on the namespace it was formerly associated with in the available namespace pool 320 from being made available or being assigned. In some embodiments the cooldown pool handler 312 may configure the released namespace cooldown pool 328 such as configuring a minimum cooldown period for the namespaces or configuring obtaining recently released namespaces from one or more namespace management layers of the provider network 200. Similarly, in some embodiments, the namespace pool handler 317 may configure the available namespace pool 32 such as configuring Obtaining cooled down namespaces from the released namespace cooldown pool 328 in configuring the release of the namespaces for association with a different resource.

In some embodiments, the namespace activity analysis 332 of the network namespace release monitoring service 204 may obtain released namespaces and associated data from the cooldown pool to generate information pertinent to the namespace. For example, namespace activity analysis 332 may determine a potential threat level that the release of the namespace may pose based on the type of resource that the namespace was released from, such as potential threat levels of moderate, severe, or critical. In another example, the namespace activity analysis 332 may start an incident workflow based on the released namespaces. In some embodiments, the incident workflow may kick off various actions including sending notifications of the incident, undertaking one or more downstream actions, and requesting approval in various steps within the workflow. In some embodiments the namespace activity analysis 332 may use the namespace data to train a machine learning model to generate classification models for evaluating activity related to a namespace, such as using a classification model to classify a threat level for a namespace release, which can then be used to determine further downstream actions (like sending notifications, namespace release blocking, or other actions, different ones of which may correspond to different determined threat levels). In some embodiments, the namespace activity analysis 332 may be a separate service apart from the network namespace release monitoring service 204, wherein the separate service may be a separate service of another network provider authorized to receive the released namespace data. In some embodiments, the namespace activity analysis 332 may provide various analysis results, such as threat level, based on the released namespaces to one or more clients of the network namespace release monitoring service 204.

FIG. 4 is logical block diagram illustrating interactions supported by an example registry interface of the network namespace release monitoring service to provide released namespaces, according to some embodiments.

In some embodiments a request for released namespaces, such as request 412 may be received. Request 412 may request one or more namespaces from the release namespace registry 330. In some embodiments, the request may include authorization credentials to access namespaces previously associated with resources belonging to a certain account. The request may also indicate a range of time from which the released namespaces may be selected to be returned from. Moreover, in some embodiments, the request may include the desired status of the namespace selected to be returned. For example, the request may indicate only the released namespaces in the cooldown pool. In some embodiments, the request 412 for released namespaces maybe a request to be sent notifications of or update to the released namespace registry 330. In some embodiments the request may further include account details to filter only the namespace formerly associated with the resources belonging to the account. The request maybe made using various communication protocols including HTTPS Protocol in various HTTPS request or RESTful requests. Once the request has been received the registry interface 322 may retrieve released namespaces 416 from the release namespace registry 330 according to the request given to the registry interface 322. In other embodiments, the request for released namespaces may be a simple list of all of the namespaces within the released namespace registry 330. In some embodiments, the requested released namespaces may be returned, as indicated at 413, using message may be formatted according to a particular markup language such as Extensible Markup Language (XML), and/or may be encapsulated using a protocol such as Simple Object Access Protocol (SOAP) or any number of message format.

The released namespace registry 330 make communicate with the namespace cooldown pool 328 to update released namespace registry 414. The update may add newly released namespaces from the namespace cooldown pool 328. The update may be requested by the released namespace registry 330 or may be sent to the released namespace registry 330 upon changes to the namespace cooldown pool 328 such as the receipt of newly released namespace. In some embodiments, the released namespace registry 330 subsequent to being updated they notified the registry interface 322 of the update. In some embodiments the notification handling 326 of the registry interface 322 may send notification of released namespaces 418. The notification handling 326 may establish a data pipeline for real-time streaming of the updates to the namespaces. In some embodiments, access to the registry may accompany a fee that could be adjusted based on volume and frequency of access to the registry. In some embodiments, one or more of the released namespaces in the released namespace registry 330 may be sent after applying a one-way hash function that generates a fingerprint of the namespaces. In this way, the one-way hash of the namespace can be used to verify that the namespace is identical to the similarly hashed namespaces that they are comparing to by the receiving client. The one-way hash provides additional security effectively hiding the original namespaces.

In some embodiments, the data stream may be sent to secondary data analysis service that trigger subsequent secondary pointer resource lookup for vulnerability identification, reporting, mitigation. These secondary data analysis service may communicate with a DNS service(s) 210 of the provider network 200, as described in FIG. 2, or other DNS services to perform subsequent lookups following the namespace to identify dangling resource vulnerabilities. In some embodiments, the various access to the namespace registry 330, notification of updates to the released namespaces, and secondary data analysis service may be dependent on the levels or "tiers" of services of the requesting client or account holders of the resources the namespaces were disassociated from.

FIG. 5 is logical block diagram illustrating interactions of network namespace release monitoring service to control the availability of namespaces for new associations, according to some embodiments.

In some embodiments the control plane 314 may modify the cooldown for namespaces 502 based on the account or user associated with the former resource of the namespace. For example, upon receipt of changes to account setting via account handler 310 that "account A" should have an extended cooldown period, the control plane 314 would modify the behavior of the namespaces that were previously associated with resources belonging to "account A" to have longer cooldown period. The cooldown periods may be tailored based on the account and may depend on the tiers of service subscribed to by the account.

In some embodiments based on the account setting the control plane 314 may restrict namespaces from being available 504. For example, based on the account setting those namespaces previously associated with resources belonging to "account A" may require approval before being made available. In some embodiments, the available namespace pool 320 may place a hold on those namespaces, such that those namespaces are not available until approved 506. In some embodiments, the hold placed on the namespace from being associated with a new resource may take place not through the available namespace pool 320, but may take place in the released namespace cooldown pool 328. The control plane 314 may change the cooldown period of the identified namespaces to prevent it from moving to the available namespace pool 320. In some embodiments the account may change the setting for notification of flagged namespaces 510. The control plane based on the account main form the notification handling 326 to send updates of new released namespaces flagged as belonging only to the account. The notification handling 326 may then send alerts of flagged namespaces 512. In some embodiments, the notification handling may send the data to the data stream and/or event services 250 that may provide resources to ingest, buffer, and process streaming data in real-time to one or more clients. In some embodiments, data stream and/or event services 250 may be an event driven systems or services and may establish a data pipeline to stream released namespaces. The streamed namespaces may be determined based on the account holder of the previously bound resource. In some embodiments, the various, notification of updates to the released namespaces, changes to the cooldown period, holds placed on namespaces in the available namespace pool 320 may be dependent on the levels or "tiers" of services of the requesting client or account holders of the resources the namespaces were disassociated from.

Figure 6:
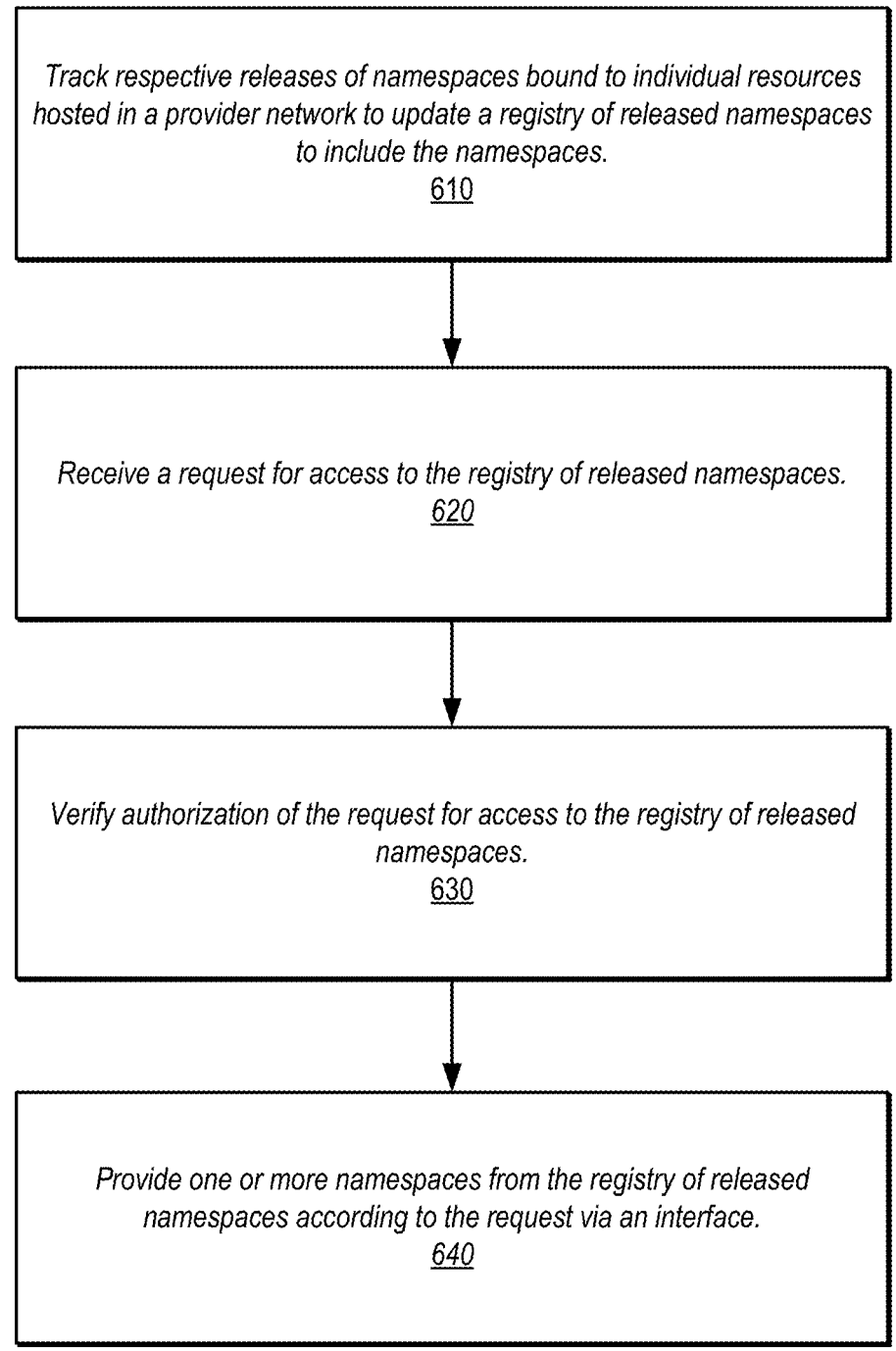
FIG. 6 is a high-level flowchart illustrating various methods and techniques to implement network namespace release monitoring service, according to some embodiments.

Although FIGS. 2-5 have been described and illustrated in the context of a provider network implementing a network namespace release monitoring service, the various components illustrated and described in FIGS. 2-5 may be easily applied to other namespace monitoring system 140 that monitor and manage network addresses or other namespace across different provider networks and resources. As such, FIGS. 2-5 are not intended to be limiting as to other embodiments of a system that may monitor different namespaces or manage other provider networks. FIG. 6 is a high-level flowchart illustrating various methods and techniques to implement network namespace release monitoring service used to monitor and manage released namespaces, according to some embodiments.

Various systems and devices may implement the various methods and techniques described below, either singly or working together. For example, a network namespace release monitoring service such as described above with regard to FIGS. 2-5 or a namespace monitoring system as discussed above with regard to FIG. 1 may implement the various methods. Alternatively, a combination of different systems and devices may implement these methods. Therefore, the above examples and or any other systems or devices referenced as performing the illustrated method, are not intended to be limiting as to other different components, modules, systems, or configurations of systems and devices.

As indicated at 610, respective releases of namespaces bound to individual resources hosted in a provider network may be tracked to update a registry of released namespaces to include the namespaces. As described in FIG. 3, in some embodiments the released namespace may track the released namespaces using a released namespace registry, released namespace cooldown pool, and/or the available namespace pool. In some embodiments, the released namespace registry may be updated with new release namespaces from the released namespace cooldown pool in regular intervals and/or as new released namespaces are provided to the cooldown pool.

As indicated at 620, a request for access to the registry of released namespaces may be received. As described in FIG. 4, the request may be made using various communication protocols including HTTPS Protocol in various HTTPS request, RESTful requests, and other API requests. In some embodiments, access to the registry may accompany a fee that could be adjusted based on volume and frequency of access to the registry.

As indicated at 630, authorization of the request for access to the registry of released namespaces may be verified. The authorization may be verified using an identity and access management system that provide access control across the namespace monitoring service and ensure least-privilege permissions. In some embodiments, the authorization of the request may include HTTP authentication using username and password sent alongside an API call, key authentication using unique keys disclosed to authorized users, using OAuth authorization framework, etc. In some embodiments, the identity credentials included in the request may include by a lookup on a username, username password, role, or other identity. Unauthorized requests with improper authorization may be denied access to the registry, and may be notified of the denial of permissions.

As indicated at 640, one or more namespaces from the registry of released namespaces according to the request via an interface may be provided. As described in FIGS. 4 and 5, the namespaces may be provided from the registry whether as a simple list of one or more released namespaces in the registry and/or may be communicated by establishing a data pipeline for real-time streaming of the updates to the namespaces. In some embodiments, one or more of the released namespaces in the released namespace registry 330 may be sent after applying a one-way hash function that generates a fingerprint of the namespaces. In some embodiments, access to the registry may accompany a fee that could be adjusted based on volume and frequency of access to the registry.

Figure 7:
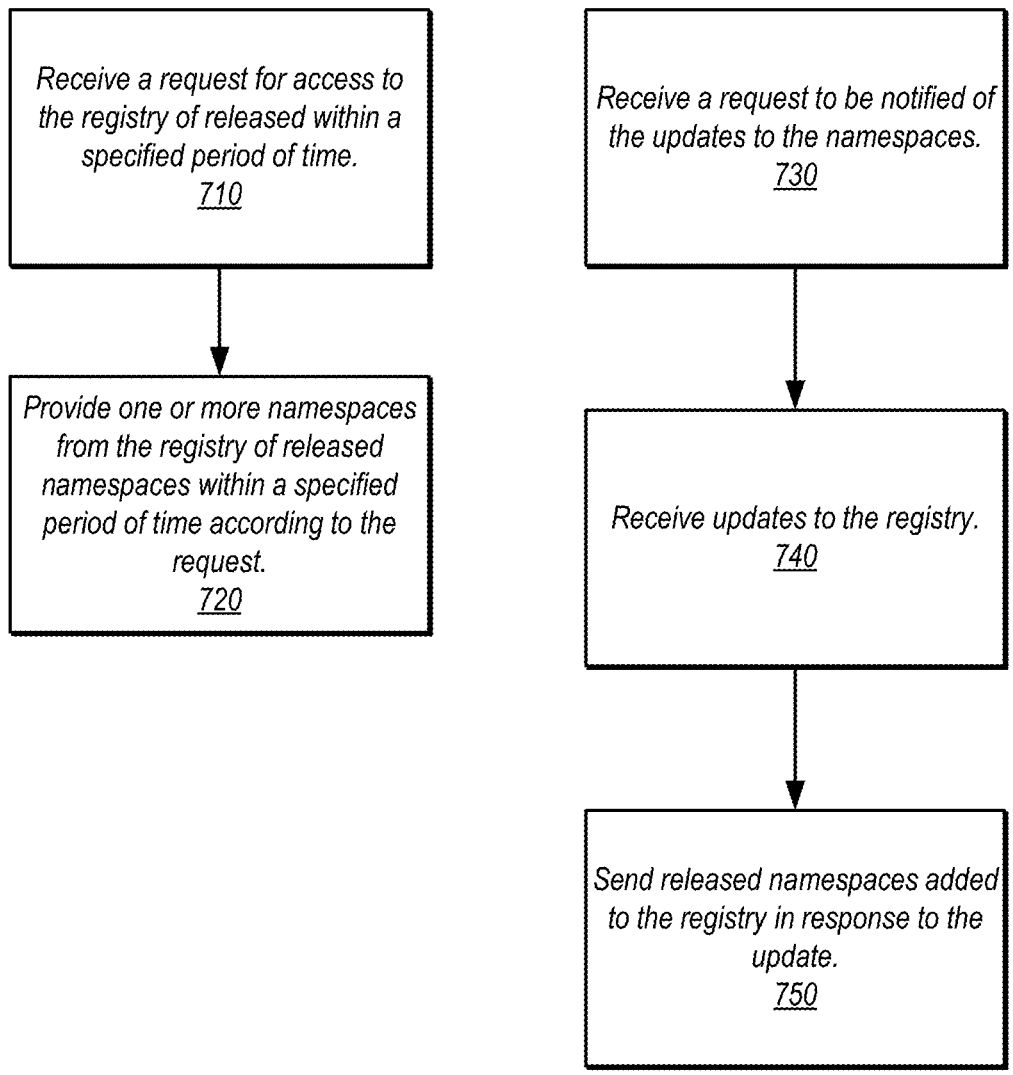
FIG. 7 is a high-level flowchart illustrating various methods and techniques to implement network namespace release monitoring service to provide released namespaces, according to some embodiments.

FIG. 7 is a high-level flowchart illustrating various methods and techniques to implement network namespace release monitoring service to provide released namespaces, according to some embodiments.

As indicated at 710, a request for access to the registry of released within a specified period of time may be received. Block 710 illustrates an instance wherein the client requests a single access request. As described in FIG. 5 the request maybe made using various communication protocols including HTTPS Protocol in various HTTPS request, RESTful requests, and other API requests. In some embodiments, access to the registry may accompany a fee that could be adjusted based on volume and frequency of access to the registry.

As indicated at 720, one or more namespaces from the registry of released namespaces within a specified period of time may be provided according to the request in manner as further described in FIG. 4.

As indicated at 730, a request to be notified of the updates to the namespaces may be received. Block 730 illustrates an instance wherein the client requests notifications to be sent to the client.

As indicated at 740, updates to the registry may be received. For example, a network released namespace monitoring service may receive updates from the namespaces cooldown pool as discussed in FIG. 4.

As indicated at 750, released namespaces added to the registry may be sent in response to the update. The notification may be sent as part of an established data pipeline and may be sent as real-time streaming of the updates to the namespaces as described in FIGS. 4-5 and may utilize data stream and/or event services described in FIG. 2 that may provide resources to ingest, buffer, and process released namespace data in real-time to one or more clients.

Figure 8:
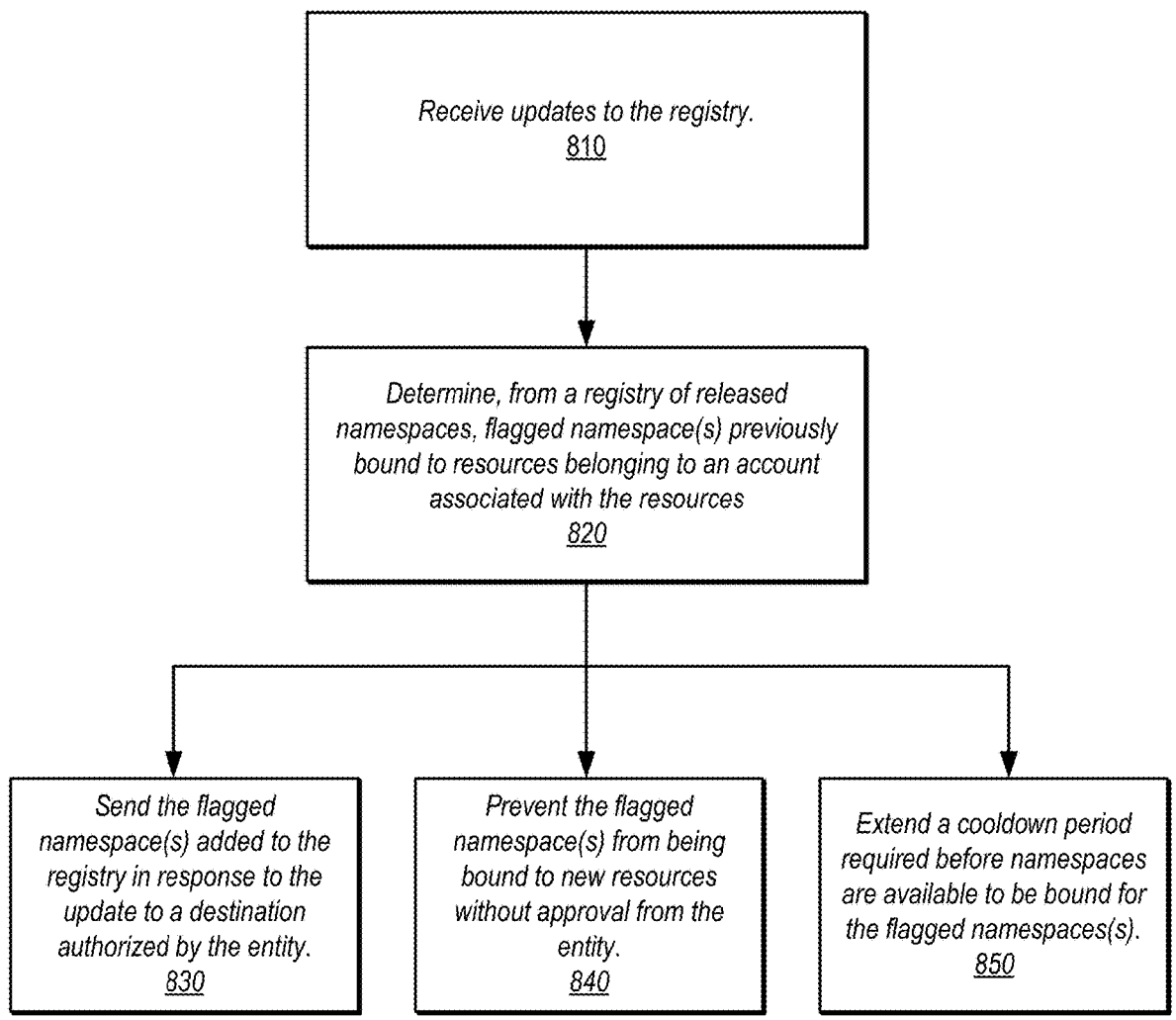
FIG. 8 is a high-level flowchart illustrating various methods and techniques to implement network namespace release monitoring service to control the availability of the released namespaces for new associations according to some embodiments.

FIG. 8 is a high-level flowchart illustrating various methods and techniques to implement network namespace release monitoring service to control the availability of the released namespaces for new associations according to some embodiments.

As indicated at 810, updates to the registry may be received. In some embodiments, updates from the namespaces cooldown pool as discussed in FIG. 4 such as the adding of newly released namespace and deleting namespaces after an expiration time period.

As indicated at 820, flagged namespaces may be determined from the registry of released namespaces that have been previously bound to resources belonging to an entity having ownership over the resource. In some embodiments, as described in FIG. 5, the flagged namespaces may be those previously associated with resources belonging to the entity. In some embodiments, the control plane based on the account main form the notification handling to send updates of new released namespaces flagged as belonging only to the account.

As indicated at 830, flagged namespaces added to the registry may be sent in response to the update to a destination authorized by the entity. In some embodiments, once the flagged namespaces are determined, the notification handling of the network released namespace monitoring service may then send alerts of flagged namespaces as described in FIGS. 4-5.

As indicated at 840, the flagged namespaces may be prevented from being bound to new resources without approval from the entity. In some embodiments, once the flagged namespaces are determined, the control plane of the network released namespace monitoring service may place a hold on flagged namespaces from being made available to be reassociated with another resource as described in FIG. 5.

As indicated at 850, the cooldown period required before namespaces are available to be bound for the flagged namespaces may be extended. In some embodiments, once the flagged namespaces are determined, the cooldown pool handling of the network released namespace monitoring service may extend the cooldown period as described in FIG. 5.

Figure 9:
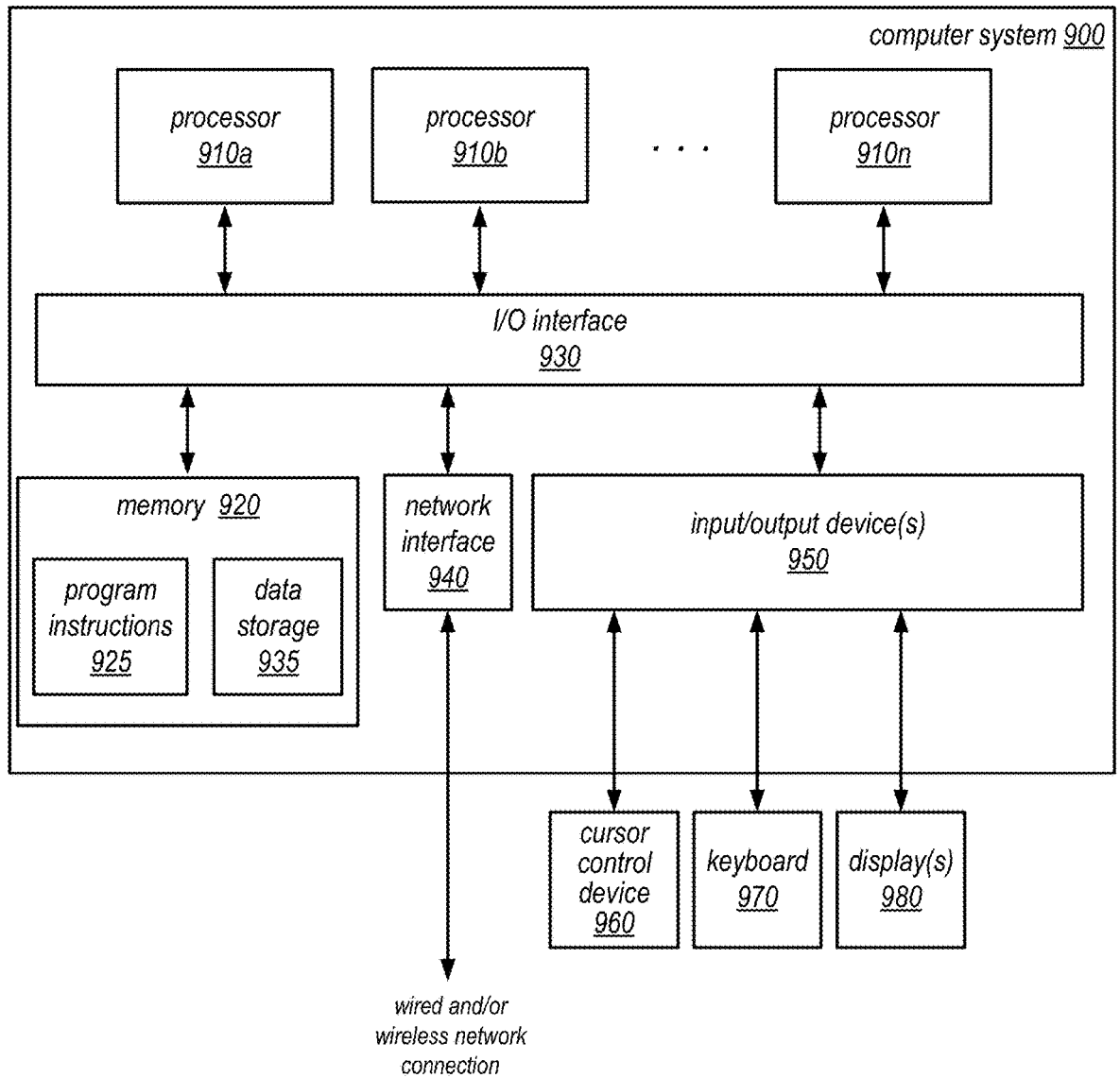
FIG. 9 illustrates an example system configured to implement the various methods, techniques, and systems described herein, according to some embodiments.

Embodiments of network namespace release monitoring service and various components that monitors and manages release of namespaces. One such computer system is illustrated by FIG. 9. In different embodiments, computer system 900 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, computing system compute system, or electronic device.

In the illustrated embodiment, computer system 900 includes one or more processors 910 coupled to a system memory 920 via an input/output (I/O) interface 930. Computer system 900 further includes a network interface 940 coupled to I/O interface 930, and one or more input/output devices 950, such as cursor control device 960, keyboard 970, and display(s) 980. Display(s) 980 may include standard computer monitor(s) and/or other display systems, technologies or devices. In at least some implementations, the input/output devices 950 may also include a touch- or multi-touch enabled device such as a pad or tablet via which a user enters input via a stylus-type device and/or one or more digits. In some embodiments, it is contemplated that embodiments may be implemented using a single instance of computer system 900, while in other embodiments multiple such systems, or multiple nodes making up computer system 900, may host different portions or instances of embodiments. For example, in one embodiment some elements may be implemented via one or more nodes of computer system 900 that are distinct from those nodes implementing other elements.

In various embodiments, computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

In some embodiments, at least one processor 910 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s).

System memory 920 may store program instructions and/or data accessible by processor 910. In various embodiments, system memory 920 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 920 as program instructions 925 and data storage 935, respectively. In other embodiments, program instructions and/or data may be received, sent or stored upon different types of computer-accessible media or on similar media separate from system memory 920 or computer system 900. Generally speaking, a non-transitory, computer-readable storage medium may include storage media or memory media such as magnetic or optical media, e.g., disk or CD/DVD-ROM coupled to computer system 900 via I/O interface 930. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 940.

In one embodiment, I/O interface 930 may coordinate I/O traffic between processor 910, system memory 920, and any peripheral devices in the device, including network interface 940 or other peripheral interfaces, such as input/output devices 950. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. In addition, in some embodiments some or all of the functionality of I/O interface 930, such as an interface to system memory 920, may be incorporated directly into processor 910.

Network interface 940 may allow data to be exchanged between computer system 900 and other devices attached to a network, such as other computer systems, or between nodes of computer system 900. In various embodiments, network interface 940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 950 may, in some embodiments, include one or more display terminals, keyboards, keypads, touchpads, scanning devices, voice or optical recognition devices, or any other devices suitable for entering or retrieving data by one or more computer system 900. Multiple input/output devices 950 may be present in computer system 900 or may be distributed on various nodes of computer system 900. In some embodiments, similar input/output devices may be separate from computer system 900 and may interact with one or more nodes of computer system 900 through a wired or wireless connection, such as over network interface 940.

As shown in FIG. 9, memory 920 may include program instructions 925, may implement the various methods and techniques as described herein, and data storage 935, comprising various data accessible by program instructions 925. In one embodiment, program instructions 925 may include software elements of embodiments as described herein and as illustrated in the Figures. Data storage 935 may include data that may be used in embodiments. In other embodiments, other or different software elements and data may be included.

Those skilled in the art will appreciate that computer system 900 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 900 may be transmitted to computer system 900 via transmission media or signals such as electrical, electromagnetic, or digital signals, conveyed via a communication medium such as a network and/or a wireless link.

Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
 one or more computing devices, respectively comprising at least one processor and a memory that implement a dangling domain name system (DNS) pointer detection system, configured to:
  monitor respective unbinding of DNS domain names of resources hosted in a provider network;
  determine a list of unbound DNS domain names using the dangling DNS pointer detection system, wherein the list includes the DNS domain names that were previously bound to the resources hosted in the provider network;
  identify, based on the list of unbound DNS domain names, one or more dangling DNS domain names;
  send an alert indicating the one or more dangling DNS domain names based on the identification of the one or more dangling DNS domain names; and
  prevent the one or more dangling DNS domain names from being bound to new resources without receipt of approval associated with an account of the provider network previously associated with the one or more dangling DNS domain names.

2. The system of claim 1, wherein the dangling DNS pointer detection system is further configured to:
 receive, via an interface of the dangling DNS pointer detection system, a request for access to the list of unbound DNS domain names, wherein:
  the request for access to the list enables monitoring of respective unbinding of DNS domain names for resources associated with the account of the provider network; and
  the alert indicating the one or more dangling DNS domain names is sent to a reporting destination determined in accordance with the request.

3. The system of claim 1, wherein the dangling DNS pointer detection system is further configured to:
 receive, via an interface of the dangling DNS pointer detection system, a request for access to the list of unbound DNS domain names, wherein:
  the request for access to the list enables monitoring of respective unbinding of DNS domain names for resources associated with the account of the provider network; and
 wherein the prevention of the one or more dangling DNS domain names from being bound to the new resources is based on the request for access to the list.

4. The system of claim 1, wherein the dangling DNS pointer detection system is further configured to:
 receive, via an interface of the dangling DNS pointer detection system, a request for access to the list of unbound DNS domain names, wherein:
  the request for access to the list enables monitoring of respective unbinding of DNS domain names for resources associated with the account of the provider network; and
 extend, based on the request for access to the list, a period required before the one or more dangling DNS domain names are available to be bound to the new resources.

5. The system of claim 1, wherein the unbound DNS domain names are unbound names of containers for objects stored using a cloud storage service, wherein the unbound names of containers have been previously bound to the resources hosted in the provider network.

6. The system of claim 1, wherein the dangling DNS pointer detection system is further configured to:
 process one or more of the respective unbinding of DNS domain names bound to the resources hosted in the provider network and associated data of the unbound DNS domain names to determine a threat level of the unbound DNS domain names.

7. The system of claim 1, wherein the dangling DNS pointer detection system is further configured to:
 process one or more of the respective unbinding of DNS domain names bound to the resources hosted in the provider network and associated data of the DNS domain names to initiate an incident workflow.

8. A method, comprising:
monitoring, by a dangling domain name system (DNS) pointer detection system, respective unbinding of DNS domain names of resources hosted in a provider network;
determining a list of unbound DNS domain names using the dangling DNS pointer detection system, wherein the list includes the DNS domain names that were previously bound to the resources hosted in the provider network;
identifying, based on the list of unbound DNS domain names, one or more dangling DNS domain names;
sending an alert indicating the one or more dangling DNS domain names based on the identification of the one or more dangling DNS domain names; and
preventing the one or more dangling DNS domain names from being bound to new resources without receipt of approval associated with an account of the provider network previously associated with the one or more dangling DNS domain names.

9. The method of claim 8, wherein the method further comprises:
receiving, via an interface of the dangling DNS pointer detection system, a request for access to the list of unbound DNS domain names, wherein:
the request for access to the list enables monitoring of respective unbinding of DNS domain names for resources associated with the account of the provider network; and
the alert indicating the one or more dangling DNS domain names is sent to a reporting destination determined in accordance with the request.

10. The method of claim 8, wherein the method further comprises:
receiving, via an interface of the dangling DNS pointer detection system, a request for access to the list of unbound DNS domain names, wherein:
the request for access to the list enables monitoring of respective unbinding of DNS domain names for resources associated with the account of the provider network; and
wherein the preventing the one or more dangling DNS domain names from being bound to the new resources is based on the request for access to the list.

11. The method of claim 8, wherein the method further comprises:
receiving, via an interface of the dangling DNS pointer detection system, a request for access to the list of unbound DNS domain names, wherein:
the request for access to the list enables monitoring of respective unbinding of DNS domain names for resources associated with the account of the provider network; and
extending, based on the request for access to the list, a period required before the one or more dangling DNS domain names are available to be bound to the new resources.

12. The method of claim 8, wherein the unbound DNS domain names are unbound names of containers for objects stored using a cloud storage service, wherein the unbound names of containers have been previously bound to the resources hosted in the provider network.

13. The method of claim 8, wherein the method further comprises:
processing one or more of the respective unbinding of DNS domain names bound to the resources hosted in the provider network and associated data of the unbound DNS domain names to determine a threat level of the unbound DNS domain names.

14. The method of claim 8, wherein the method further comprises:
processing one or more of the respective unbinding of DNS domain names bound to the resources hosted in the provider network and associated data of the DNS domain names to initiate an incident workflow.

15. One or more non-transitory, computer-readable storage media, storing program instructions that when executed on or across one or more computing devices cause the one or more computing devices to implement a dangling domain name system (DNS) pointer detection system that implements:
monitoring, by a dangling DNS pointer detection system, respective unbinding of DNS domain names of resources hosted in a provider network;
determining a list of unbound DNS domain names using the dangling DNS pointer detection system, wherein the list includes the DNS domain names that were previously bound to the resources hosted in the provider network;
identifying, based on the list of unbound DNS domain names, one or more dangling DNS domain names;
sending an alert indicating the one or more dangling DNS domain names based on the identification of the one or more dangling DNS domain names; and
preventing the one or more dangling DNS domain names from being bound to new resources without receipt of approval associated with an account of the provider network previously associated with the one or more dangling DNS domain names.

16. The one or more non-transitory, computer-readable storage media of claim 15, wherein the storage media further comprise additional program instructions that, when executed on or across the one or more computing devices, causes the dangling DNS pointer detection system to implement:
receiving, via an interface of the dangling DNS pointer detection system, a request for access to the list of unbound DNS domain names, wherein:
the request for access to the list enables monitoring of respective unbinding of DNS domain names for resources associated with the account of the provider network; and
the alert indicating the one or more dangling DNS domain names is sent to a reporting destination determined in accordance with the request.

17. The one or more non-transitory, computer-readable storage media of claim 15, wherein the storage media further comprise additional program instructions that, when executed on or across the one or more computing devices, causes the dangling DNS pointer detection system to implement:
receiving, via an interface of the dangling DNS pointer detection system, a request for access to the list of unbound DNS domain names, wherein:
the request for access to the list enables monitoring of respective unbinding of DNS domain names for resources associated with the account of the provider network; and
wherein the preventing the one or more dangling DNS domain names from being bound to the new resources is based on the request for access to the list.

18. The one or more non-transitory, computer-readable storage media of claim 15, wherein the storage media further comprise additional program instructions that, when executed on or across the one or more computing devices, causes the dangling DNS pointer detection system to implement:

receiving, via an interface of the dangling DNS pointer detection system, a request for access to the list of unbound DNS domain names, wherein:

the request for access to the list enables monitoring of respective unbinding of DNS domain names for resources associated with the account of the provider network; and extending, based on the request for access to the list, a period required before the one or more dangling DNS domain names are available to be bound to the new resources.

19. The one or more non-transitory, computer-readable storage media of claim 15, wherein the storage media further comprise additional program instructions that, when executed on or across the one or more computing devices, causes the dangling DNS pointer detection system to implement:

processing one or more of the respective unbinding of DNS domain names bound to the resources hosted in the provider network and associated data of the unbound DNS domain names to determine a threat level of the unbound DNS domain names.

20. The one or more non-transitory, computer-readable storage media of claim 15, wherein the storage media further comprise additional program instructions that, when executed on or across the one or more computing devices, causes the dangling DNS pointer detection system to implement:

processing one or more of the respective unbinding of DNS domain names bound to the resources hosted in the provider network and associated data of the DNS domain names to initiate an incident workflow.

\* \* \* \* \*